(12) United States Patent
Wiedemann et al.

(10) Patent No.: US 10,293,715 B2
(45) Date of Patent: May 21, 2019

(54) MOTOR VEHICLE

(71) Applicant: Bayerische Motoren Werke Aktiengesellschaft, Munich (DE)

(72) Inventors: Ulrich Wiedemann, Munich (DE); Marcus Raepple, Walpertskirchen (DE); Vlad Popa, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/499,282

(22) Filed: Apr. 27, 2017

(65) Prior Publication Data

US 2017/0225594 A1 Aug. 10, 2017

Related U.S. Application Data

(63) Continuation of application No. PCT/EP2015/073969, filed on Oct. 16, 2015.

(30) Foreign Application Priority Data

Oct. 28, 2014 (DE) .................. 10 2014 221 886

(51) Int. Cl.
*B60N 2/00* (2006.01)
*B60N 2/28* (2006.01)

(52) U.S. Cl.
CPC ..................... *B60N 2/289* (2013.01)

(58) Field of Classification Search
CPC ......... Y10T 29/49826; Y10T 29/49002; A61F 2/0063; B29C 45/006; B29C 45/14065;
(Continued)

(56) References Cited

U.S. PATENT DOCUMENTS 2,775,799 A * 1/1957 Gerhard ............... E05B 15/022
 292/341.15
3,127,652 A * 4/1964 Springer .................. B60R 22/30
 24/165
(Continued)

FOREIGN PATENT DOCUMENTS

CN 101096188 A 1/2008
CN 102625883 A 8/2012
(Continued)

OTHER PUBLICATIONS

International Search Report (PCT/ISA/210) issued in PCT Application No. PCT/EP2015/073969 dated Jan. 25, 2016 with English translation (Six (6) pages).

(Continued)

*Primary Examiner* — Kiran B Patel
(74) *Attorney, Agent, or Firm* — Crowell & Moring LLP

(57) ABSTRACT

ISOFIX systems are used for fastening child seats in a motor vehicle. A motor vehicle is provided in which the ISOFIX restraint systems have adequate crash safety despite being longer than customary ISOFIX securing clamps. This is achieved in that at least individual ISOFIX securing clamps have an overall length lying within a range of 50 mm to 120 mm, and a reinforcing component is mounted on each ISOFIX securing clamp at a body-side end of each ISOFIX securing clamp. Each reinforcing component has a height which corresponds to a length of longitudinal portions of each ISOFIX securing clamp, and a body-side portion of the longitudinal portions of each ISOFIX securing clamp is supported by each reinforcing component.

7 Claims, 4 Drawing Sheets

(58) Field of Classification Search
CPC ............... B29C 66/7212; B29C 66/71; H01L 2224/48091; B29K 2063/00; B29K 2307/04
USPC ............................................ 296/63, 216.11
See application file for complete search history.

(56) References Cited

U.S. PATENT DOCUMENTS

| | | | | |
|---|---|---|---|---|
| 4,838,513 A * | 6/1989 | Kondo | ............... | B60N 2/10 248/503.1 |
| 4,998,759 A * | 3/1991 | Peterson | ............... | E05B 85/045 292/340 |
| 5,215,342 A | 6/1993 | Yuge et al. | | |
| 5,494,324 A * | 2/1996 | Kleefeldt | ............... | E05B 85/045 292/216 |
| 5,606,784 A * | 3/1997 | Hamamoto | ............ | B60N 2/015 24/580.1 |
| 5,649,783 A * | 7/1997 | Ichikawa | ............... | B60N 2/015 24/297 |
| 5,700,056 A * | 12/1997 | Bernard | ................. | B60N 2/366 292/DIG. 27 |
| 5,704,231 A * | 1/1998 | Heald | .................... | E05B 17/002 70/424 |
| 5,890,831 A * | 4/1999 | Kato | ...................... | B60N 2/015 248/503.1 |
| 6,123,379 A * | 9/2000 | Yamada | ............. | B60N 2/01583 296/65.03 |
| 6,135,533 A * | 10/2000 | Mack | ................. | B60N 2/01516 296/65.03 |
| 6,145,173 A * | 11/2000 | Suzuki | ................. | F16B 5/0607 24/582.1 |
| 6,234,572 B1 * | 5/2001 | Shiino | .................... | B60N 2/286 297/253 |
| 6,253,713 B1 * | 7/2001 | Giedeman, III | ..... | A01K 1/0263 119/771 |
| 6,276,754 B1 * | 8/2001 | Youssef-Agha | ......... | B60N 2/28 24/682.1 |
| 6,361,115 B1 * | 3/2002 | Aufrere | ................ | B60N 2/2821 297/216.11 |
| 6,390,560 B1 * | 5/2002 | Gandhi | .................... | B60N 2/28 297/253 |
| 6,474,616 B2 * | 11/2002 | Yamada | ............. | B60N 2/01508 248/503.1 |
| 6,485,055 B1 * | 11/2002 | Swayne | ............... | B60N 2/2806 280/801.1 |
| 6,574,833 B1 * | 6/2003 | Tomaiuolo | ............. | B60N 3/026 16/110.1 |
| 6,631,958 B1 * | 10/2003 | Herrmann | ............. | B60N 2/2821 297/253 |
| 7,281,763 B1 | 10/2007 | Hayashi et al. | | |
| 7,520,555 B2 * | 4/2009 | Malapati | ............. | B60N 2/2809 296/1.04 |
| 8,439,436 B2 * | 5/2013 | Kato | ................... | B60L 11/1874 297/180.1 |
| 8,882,169 B2 * | 11/2014 | Tanaka | ................. | B60N 2/2245 296/65.03 |
| 9,016,792 B2 * | 4/2015 | Muck | ..................... | B60N 2/305 297/14 |
| 9,499,070 B2 * | 11/2016 | Fujii | ................... | B60N 2/01583 |
| 9,718,379 B2 * | 8/2017 | Wagner | ................ | B60N 2/289 |
| 9,738,183 B2 * | 8/2017 | Szlag | ....................... | B60N 2/58 |
| 9,827,884 B2 * | 11/2017 | Susko | ................... | B60N 2/2893 |
| 2003/0090114 A1 * | 5/2003 | Kang | ................... | E05B 15/0205 292/340 |
| 2003/0184138 A1 * | 10/2003 | Haverkamp | ......... | B60N 2/2809 297/254 |
| 2004/0080193 A1 * | 4/2004 | Tong | .................... | B60N 2/2893 297/250.1 |
| 2004/0080194 A1 * | 4/2004 | Medvecky | ........... | B60N 2/2887 297/253 |
| 2004/0227384 A1 * | 11/2004 | Smallwood | ............ | B60N 2/286 297/253 |
| 2004/0261246 A1 | 12/2004 | Duffy et al. | | |
| 2008/0111411 A1 | 5/2008 | Glover et al. | | |
| 2012/0112474 A1 * | 5/2012 | Muramatsu | ............. | E05B 77/36 292/164 |
| 2012/0112477 A1 * | 5/2012 | Muramatsu | ............. | E05B 77/36 292/340 |
| 2012/0275854 A1 | 11/2012 | Maguire | | |
| 2013/0147246 A1 * | 6/2013 | Nakakita | ............... | B60N 2/2893 297/253 |
| 2017/0355286 A1 * | 12/2017 | Terada | .................... | B60N 2/289 |

FOREIGN PATENT DOCUMENTS

| | | |
|---|---|---|
| CN | 103373255 A | 10/2013 |
| CN | 103459196 A | 12/2013 |
| DE | 695 02 142 T2 | 8/1998 |
| DE | 10 2004 048 358 A1 | 4/2006 |
| DE | 10 2005 054 299 A1 | 5/2007 |
| DE | 10 2011 016 291 A1 | 10/2012 |
| DE | 10 2011 056 794 A1 | 6/2013 |
| EP | 0 694 436 A1 | 1/1996 |
| JP | 2004-149091 A | 5/2004 |

OTHER PUBLICATIONS

German-language Written Opinion (PCT/ISA/237) issued in PCT Application No. PCT/EP2015/073969 dated Jan. 25, 2016 (Six (6) pages).

German-language Search Report issued in counterpart German Application No. 10 2014 221 886.1 dated Jun. 24, 2015 with partial English translation (Thirteen (13) pages).

Chinese-language Office Action issued in counterpart Chinese Application No. 201580057606.1 dated Aug. 28, 2018 with English translation (14 pages).

* cited by examiner

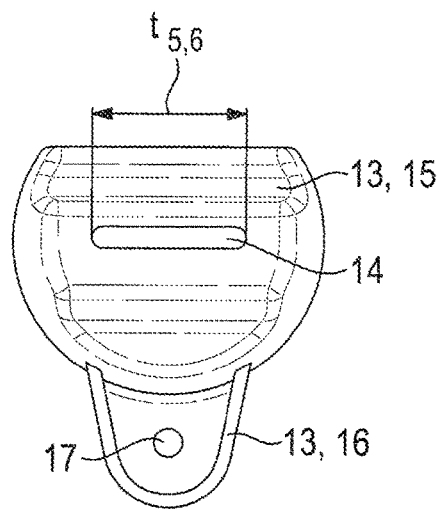
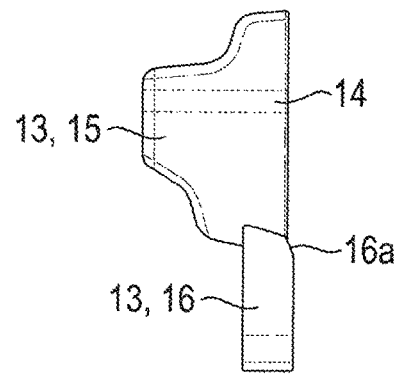
Fig. 4    Fig. 5
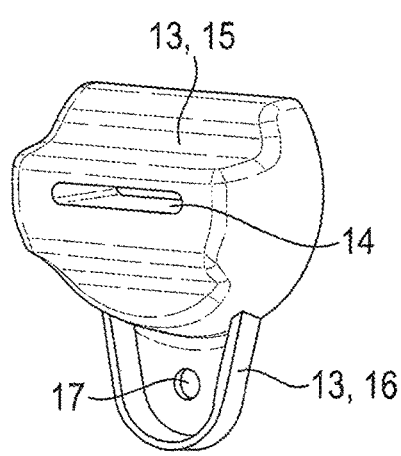
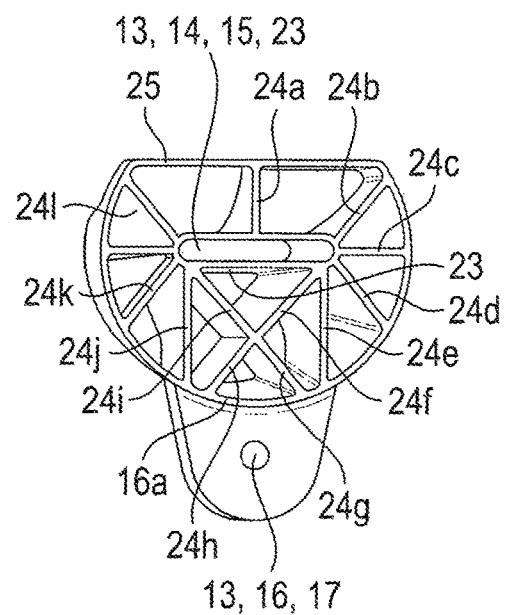
Fig. 6    Fig. 7

MOTOR VEHICLE

CROSS REFERENCE TO RELATED APPLICATIONS

This application is a continuation of PCT International Application No. PCT/EP2015/073969, filed Oct. 16, 2015, which claims priority under 35 U.S.C. § 119 from German Patent Application No. 10 2014 221 886.1, filed Oct. 28, 2014, the entire disclosures of which are herein expressly incorporated by reference.

BACKGROUND AND SUMMARY OF THE INVENTION

The invention relates to a motor with a floor assembly on which at least one individual rear seat or at least one rear seat bench is arranged, wherein between a backrest and a seat part of the respective individual rear seat, or between a backrest and a seat part of the respectively present rear seat bench, ISOFIX securing clamps are provided corresponding to the provided number of places for securing child seats.

DE 10 2004 048 358 B4 discloses a motor vehicle in which ISOFIX bindings or ISOFIX restraint systems are used. By way of the ISOFIX bindings or ISOFIX restraint systems, child seats can be fastened to standardized securing clamps on rear seat benches or on individual rear seats (ISO 13216-1, International Organization for Standardization); standardized rigid fixing system for child safety systems).

For example, the diameter of the wire of the securing clamp is standardized. Likewise, the distance between the longitudinal portions of the U-shaped securing clamp is standardized. Generally, the length of the two parallel longitudinal portions of the U-shaped securing clamp is approximately 45 mm±15 mm.

The object of the invention is to provide a motor vehicle in which lengthened ISOFIX securing clamps are used in the respectively present number of individual rear seats or rear seat benches.

This and other objects are achieved by a motor vehicle according to the invention having a floor assembly on which at least one individual rear seat or at least one rear seat bench is arranged. Between a backrest and a seat part of the respective individual rear seat, or between a backrest and a seat part of the respectively present rear seat bench, ISOFIX securing clamps are provided corresponding to the provided number of places for securing child seats.

Advantageously, at least individual ISOFIX securing clamps are provided that have an overall length $l_{5,6}$ lying within a range of between 50 mm and 120 mm. A reinforcing component is mounted on each ISOFIX securing clamp having an overall length $l_{5,6}$ which is greater than or equal to 50 mm at a body-side end of the respective ISOFIX securing clamp.

Advantageously, the respective reinforcing component has a height $h_{13}$; $h_{27}$, $h_{27,28}$ which corresponds to a length $l_{13}$, $l_{27}$, $l_{27,28}$ of the longitudinal portions of the respective ISOFIX securing clamp. A body-side portion of the longitudinal portions of the respective ISOFIX securing clamp is supported by the respective reinforcing component.

Advantageously, the lengths $l_{13}$, $l_{27}$, $l_{27,28}$ of the longitudinal portions of the respective ISOFIX securing clamp (corresponding to the heights of the reinforcing component $h_{13}$; $h_{27}$, $h_{27,28}$) lie within a range of 10 mm≤$l_{13}$ ($h_{13}$)≤60 mm or 10 mm≤$l_{27}$, ($h_{27}$)≤30 mm and 10 mm≤$l_{27,28}$, ($h_{27,28}$)≤30 mm.

In an advantageous embodiment, the reinforcing component and the additional reinforcing component are made of a plastic. The shape and the material properties of the reinforcing component and of the additional reinforcing component are such that lateral forces which act on the respective ISOFIX securing clamp, the respective reinforcing component and/or the respective additional reinforcing component are also supported free of destruction.

Advantageously, the respective reinforcing component is fastened to the respective securing clamp by the respective securing clamp being pushed through the respective through-opening of the respective reinforcing component.

Advantageously, the respective reinforcing component is additionally or alternatively fastened to the body (floor assembly) by a screw connection, a clip connection or the like.

In an advantageous embodiment, the respective reinforcing component is additionally or alternatively fastened to the body (floor assembly) by an adhesive connection.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 is a front view of the first embodiment of the reinforcing component.

FIG. 5 is a side view of the reinforcing component shown in FIG. 4.

FIG. 6 is a perspective view of the reinforcing component shown in FIG. 4.

FIG. 7 is a perspective view of a rear face of the reinforcing component shown in FIG. 4.

DETAILED DESCRIPTION OF THE DRAWINGS

Figure 1:
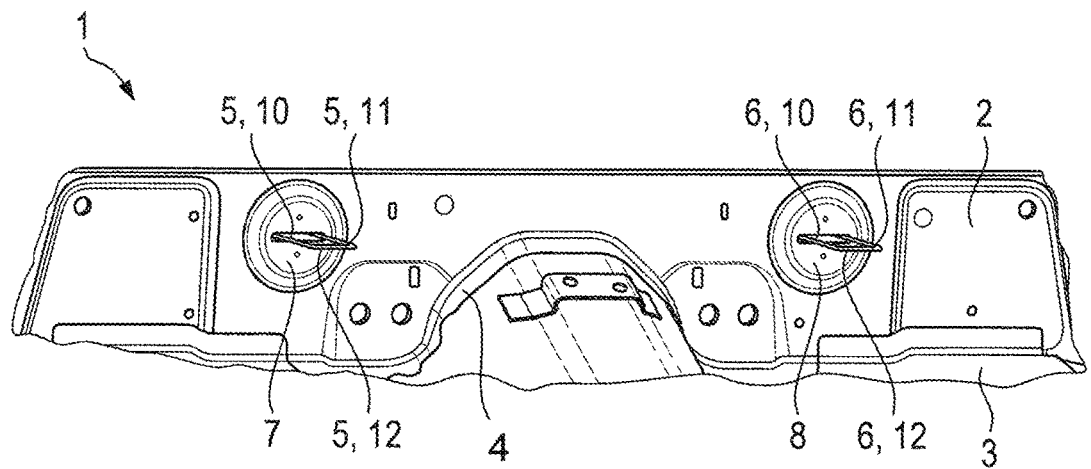
FIG. 1 is a perspective view of a vehicle body portion for the arrangement of a backrest of a rear seat bench, wherein a tunnel for a cardan shaft is visible in FIG. 1, wherein an end face of the tunnel is fastened on the body portion.

FIG. 1 shows a body portion 2 of a motor vehicle 1 which adjoins a floor plate 3. In the embodiment shown, a housing 4 of a tunnel for a cardan shaft is arranged on the body portion 2.

Two ISOFIX securing clamps 5 and 6 are shown on the body portion 2. In the text below, the ISOFIX securing clamps 5, 6 are referred to as securing clamps 5, 6. Each securing clamp 5, 6 has a U shape composed of two parallel longitudinal portions 10, 11 and one transverse portion 12 that connects the longitudinal portions 10, 11.

In the embodiment shown in FIG. 1, the securing clamps 5, 6 are fastened, for example welded, in a known manner onto a rotationally symmetrical component 7, 8.

Figure 3:
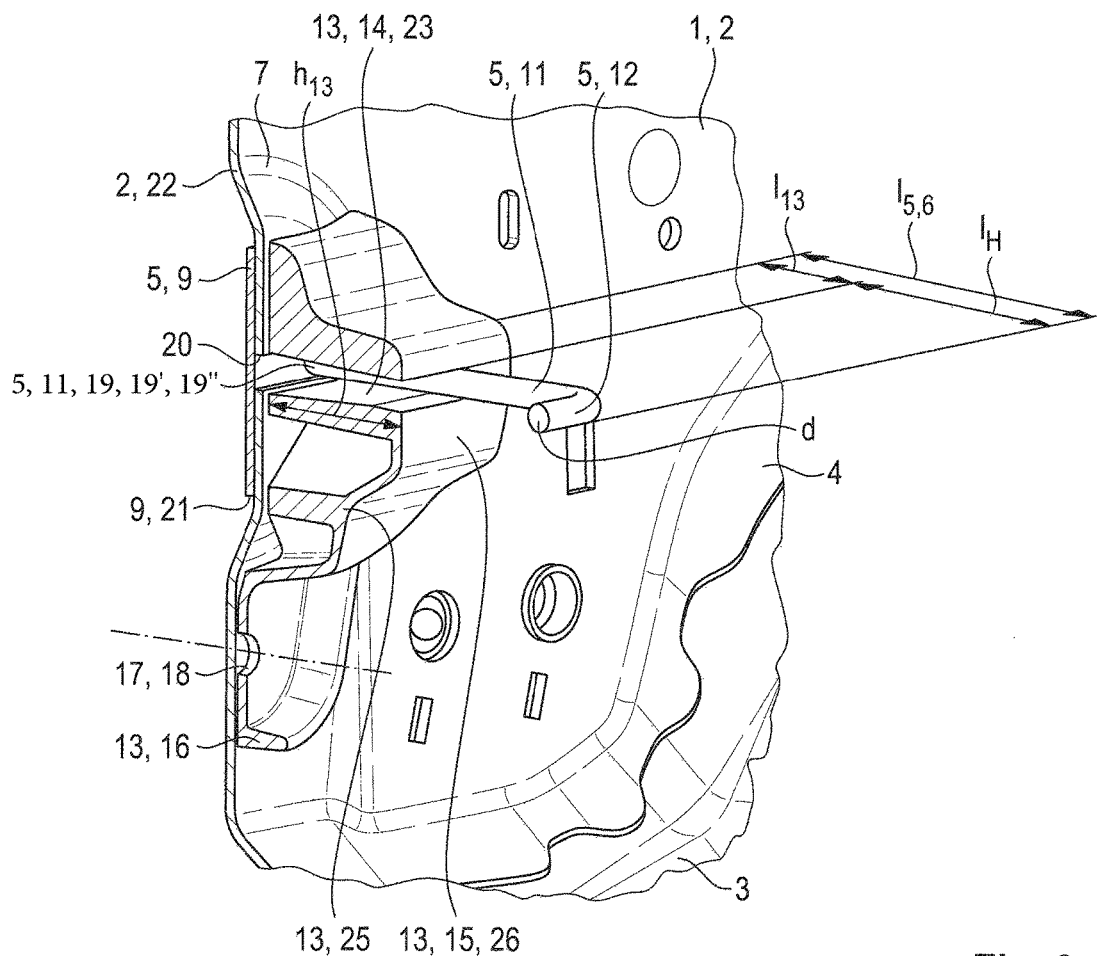
FIG. 3 is a longitudinal section through the ISOFIX securing clamp shown in FIG. 3.

For fastening, the securing clamps 5, 6 shown in FIG. 1 have a foot portion 9, which is shown in FIG. 3 and on which the respective securing clamp 5, 6 is fastened, for example welded. This foot portion 9 is fastened, for example welded, to the rotationally symmetrical body component 7, 8.

A diameter $d_{12}$ of the wire used for producing the transverse portion 12 is standardized. The diameter d of the used wire is 6 mm+/−0.1 mm. Moreover, the distance $t_{5,6}$ between the two parallel longitudinal portions 10, 11 is standardized (see FIGS. 4, 8). This distance $t_{5,6}$ corresponds at least to the length of the transverse portion 12 of the respective securing clamp 5, 6.

Figure 2:
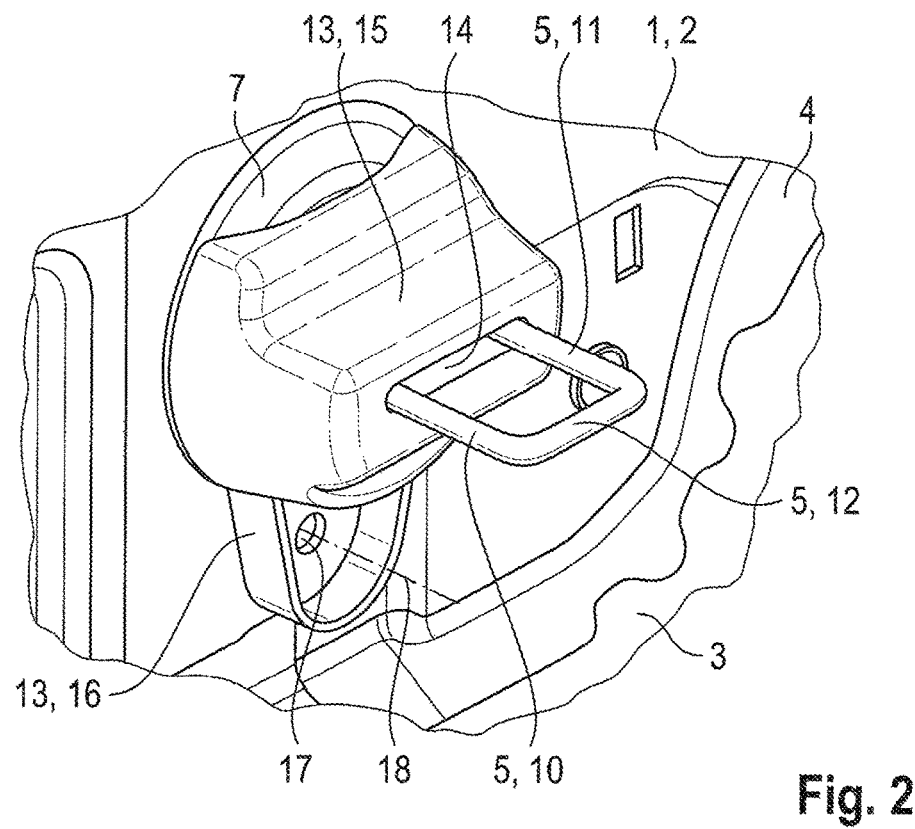
FIG. 2 is a perspective view of an enlarged area in FIG. 1, from which the design of an ISOFIX securing clamp with a reinforcing component of a first embodiment can be seen.

FIG. 2 shows an enlarged perspective view of the securing clamp 5 fastened to the body portion 2. In contrast to FIG. 1, a reinforcing component 13 is additionally arranged on the securing clamp 5.

In the embodiment shown, the reinforcing component 13 has an upper portion 15 provided with a through-opening 14, and a lower portion 16 integrally connected to the upper portion 15 and having a through-opening 17.

The upper portion 15 of the reinforcing component 13 serves to reinforce the securing clamp 5. The through-opening 17 of the lower portion 16 serves for fastening the component 13 to the body portion 2 via a fastening element 18 (indicated symbolically by a dot-and-dash line).

FIG. 3 shows a longitudinal section through the securing clamp 5 provided with the reinforcing component 13. In FIG. 3, the foot portion 9 of the securing clamp 5 can be seen, which is fastened to the respective end 19 of respective longitudinal portions 10, 11 of the reinforcing component 13.

In the body portion 2, a through-opening 20 is formed whose size and shape are such that the securing clamps 5, 6 can be pushed through the through-opening 20. As soon as the foot portion 9 bears with its outer surface 21 on the outer surface 22 of the body portion 2, the foot portion 9 is fastened via a suitable fastening, for example via weld points.

The through-opening 14 on the upper portion 15 of the reinforcing component 13 is dimensioned in terms of its cross section in such a way that the transverse portion 12 of a securing clamp 5, 6 can be pushed through the through-opening 14.

In the embodiment shown, the through-opening 14 has a peripheral side wall 23 which, by way of longitudinal webs 24a to 24l shown in FIG. 7, are integrally connected to a peripheral outer wall 25 for support and stiffening.

It will be clear from the sectional view in FIG. 3 that the respective longitudinal portions 10, 11 of the securing clamp 5, 6 are supported along a length $l_{13}$ by the upper portion 15 of the reinforcing component 13. The length $l_{13}$ corresponds to the height $h_{13}$ of the reinforcing component 13. Beyond an end face 26 of the upper portion 15 of the reinforcing component 13, the respective longitudinal portion 10, 11 of the securing clamp 5 (6) protrude by a length $l_H$.

The longitudinal portions 10, 11 of the respective securing clamp 5, 6 have an overall length $l_{5,6}$. In the embodiment shown, the overall length $l_{5,6}$ lies within a range of 50 mm≤$l_{5,6}$≤120 mm. The overall length $l_{5,6}$ of the used securing clamps 5, 6 depends on design conditions of the body, the arrangement and design of the rear bench or of the rear seats, and/or the thickness of the padding of the seats.

The length $l_{13}$ or the height $h_{13}$ of the upper portion 15 of the reinforcing component 13 depends, among other things, on whether the provided securing clamps 5, 6 pass the prescribed load tests. Accordingly, the height $h_{13}$ of the upper portion 15 of the reinforcing component 13 can lie within a range of 10 mm≤$l_{13}$≤60 mm.

FIGS. 4, 5, 6 and 7 show different views of the reinforcing component 13. It will additionally be seen from FIG. 5 that the lower portion 16 has a small shoulder 16a in relation to the upper portion 15. The shoulder 16a is necessary since, in the embodiment shown, the body component 7, 8 on which the securing clamp 5, 6 is fastened is curved and protrudes into a vehicle interior.

By virtue of the curved design of the respective component 7, 8 in one embodiment, the foot portion 9 of the respective securing clamp 5, 6 is fastened in a lowered area, such that the foot portion 9 does not protrude above the outer surface 22 of the body portion 2.

Figure 8:
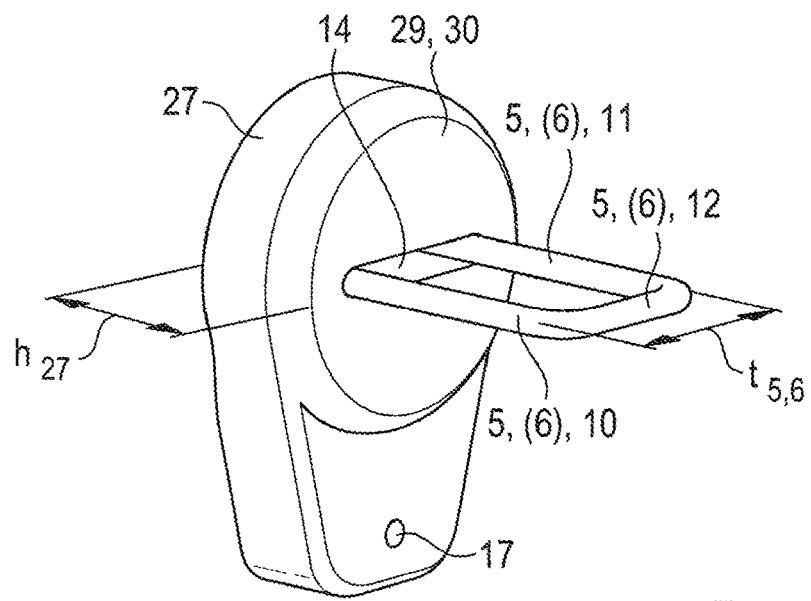
FIG. 8 is a second embodiment of a reinforcing component, which is arranged on an ISOFIX securing clamp.
Figure 9:
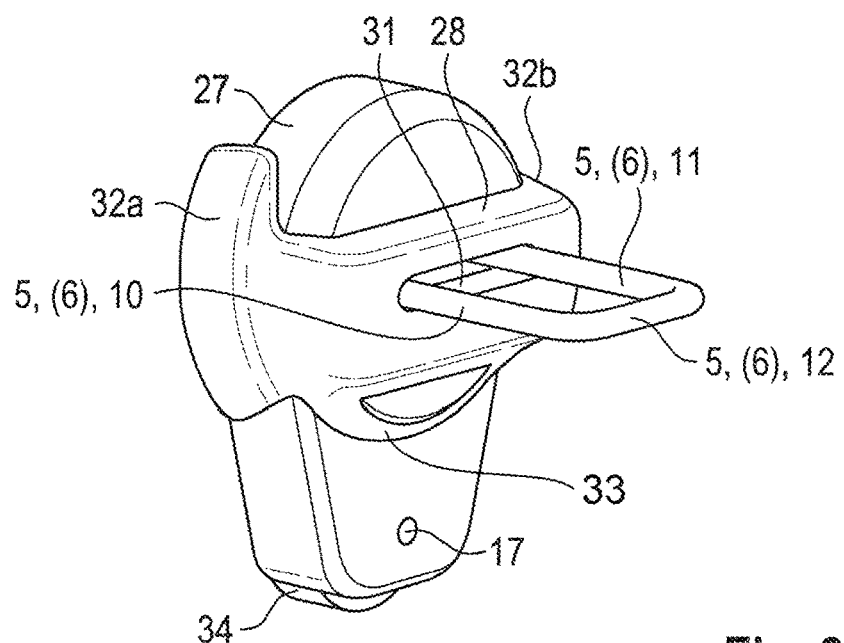
FIG. 9 is a perspective view of the reinforcing component shown in FIG. 8, wherein an additional reinforcing component is fastened to the reinforcing component in order to increase an overall thickness in the longitudinal direction of the ISOFIX securing clamp.

FIGS. 8 and 9 show perspective views of a second embodiment of a reinforcing component 27, which is provided with an additional reinforcing component 28 in FIG. 9. The reinforcing component 27 and the additional reinforcing component 28 likewise have the through-openings 14, 31 and 17 as in the reinforcing component 13.

The reinforcing component 27 differs from the reinforcing component 13 in geometry, since an upper portion 29 of the reinforcing component 27 has an end face 30 which is rotationally symmetrical and plane.

The additional reinforcing component 28 likewise has a through-opening 31 whose size and shape are such that the respective securing clamp 5, 6 can be pushed through.

Moreover, the additional reinforcing component 28 can have portions 32a and 32b and also 33 and 34, which serve to secure the additional reinforcing component 28 on the reinforcing component 27.

A reinforcing component 13; 27; 28 is mounted on the respective ISOFIX securing clamp 5, 6 having an overall length $l_{5,6}$≥approx. 50 mm at a body-side end 19 of the respective ISOFIX securing clamp 5, 6; 10, 11. Each reinforcing component 13; 27; 28 has a respective height $h_{13}$; $h_{27}$, $h_{27,28}$ which corresponds to a respective length $l_{13}$, $l_{27}$, $l_{27,28}$ of body-side portions 19', 19'' of the longitudinal portions 10, 11 of the respective ISOFIX securing clamp 5, 6. A body-side portion 19', 19'' of the longitudinal portions 10, 11 of the respective ISOFIX securing clamp 5, 6 is supported by the respective reinforcing component 13; 27; 28.

The lengths $l_{13}$, $l_{27}$, $l_{27,28}$; ($l_{13}$; $h_{27}$, $h_{27,28}$) lie within a range of 10 mm≤$l_{13}$; ($h_{13}$)≤60 mm, 10 mm≤$l_{27}$; ($h_{27}$)≤60 mm, and 10 mm≤$l_{27,28}$; ($h_{27,28}$)≤30 mm.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle with a floor on which at least one individual rear seat or rear seat bench is arranged, comprising:
   securing clamps, wherein
      individual ones of the securing clamps have an overall length lying within a range of 50 mm to 120 mm;
   a reinforcing component mounted on each securing clamp having an overall length ≥50 mm at a body-side end of the securing clamp, wherein
      each reinforcing component has a height which corresponds to a length of body-side portions of longitudinal portions of each securing clamp, and the body-side portion of the longitudinal portions of each securing clamp are supported by the reinforcing component.

2. The motor vehicle according to claim 1, wherein the length of the body-side portion of the longitudinal portions of the securing clamp supported by the reinforcing component lies within a range of 10 mm to 60 mm.

3. The motor vehicle according to claim 1, wherein the length of the body-side longitudinal portions of the securing clamp supported by the reinforcing component lies within a range of 10 mm to 30 mm.

4. The motor vehicle according to claim 2, wherein the reinforcing component is formed of first and second reinforcing component parts mounted together to form the reinforcing component.

5. The motor vehicle according to claim 4, wherein
the first and second parts of the reinforcing component are made of a plastic or fiber-composite plastic, and
a shape and material properties of the first and second parts are such that lateral forces acting on the securing clamp and the first and second parts are supported in a destruction free manner.

6. The motor vehicle according to claim 1, wherein
the reinforcing component comprises a through-opening, and
the reinforcing component is fastened to the securing clamp via the securing clamp passing through the through-opening.

7. The motor vehicle according to claim 6, wherein the reinforcing component is fastened to the floor.

* * * * *